(12) United States Patent
Veinot et al.

(10) Patent No.: US 7,906,672 B2
(45) Date of Patent: Mar. 15, 2011

(54) METHOD FOR PREPARING SIZE-CONTROLLED SILICON CARBIDE NANCRYSTALS

(75) Inventors: Jonathan Gordon Conn Veinot, St. Albert (CA); Eric James Henderson, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 0 days.

(21) Appl. No.: 12/637,045

(22) Filed: Dec. 14, 2009

(65) Prior Publication Data

US 2010/0256408 A1 Oct. 7, 2010

Related U.S. Application Data

(60) Provisional application No. 61/122,798, filed on Dec. 16, 2008.

(51) Int. Cl.
*C07C 7/18* (2006.01)
(52) U.S. Cl. ......................... 556/450; 556/466
(58) Field of Classification Search .................. 556/450, 556/466
See application file for complete search history.

(56) References Cited

OTHER PUBLICATIONS

Henderson, E.J. and Vienot, J.G.G., 41st Silicon Symposium, San Francisco, California, Apr. 24-26, 2008.
Henderson, E.J. And Vienot, J.G.G., "From Phenylsiloxane Polymer Composition to Size-Controlled Silicon Carbide Nannocrystals", J. Am. Chem Soc. 2009, 131, 809-815.
Hurwitz. F.I. et al., "Characterization of the pyrolytic conversion of polysilsesquioxanes to silicon oxycarbides", Journal of Materials Science 28, 1993, 6622-6630.
Wang Chia-Hsin et al., "Silicon Carbide Nanostructures from Reactions between Vapors of Organochlorosilanes and Liquid of Sodium-Factors Affecting Morphology and Compositions", Journal of the Chinese Chemical Society, 2007, 54, 1477-1484.
Mutin, P Hubert, "Control of the Composition and Structure of Silicon Oxycarbide and Oxynitride Glasses Derived from Polysiloxane Precursors", Journal of Sol-Gel Sciences and Technology 14, 27-38, 1999.
Tartaj Pedro, et al., "Electrokinetic Behavior and Stability of Silicon Carbide Nanoparticulate Dispersions", J. Am. Ceram. Soc., 81 [2] 389-394, 1998.
Brequel, H. et al., "Study of the Phase Seperation in Amorphous Silicon Oxycarbide Glasses Under Heat Treatment", NanoStructured Materials, vol. 11, No. 6, pp. 721-731, 1999.
Rosso, M.; Arafat, A.; Schroën, K.; Giesbers, M.; Roper, C. S.; Maboudian, R.; Zuilhof, H. Langmuir. 2008, 24, 4007-4012.
Schoell, S. J.; Hoeb, M.; Sharp, I. D.; Steins, W.; Eickhoff, M.; Stutzmann, M.; Brandt, M. S. Appl. Phys. Lett. 2008, 92, 153301.
Alekseev, S. A.; Zaitsev, V. N.; Botsoa, J.; Barbier, D. Chem. Mater. 2007, 19, 2189-2194.
Ma, J.; Shi, L. H.; Zhang, J. M.; Li, B. Y.; Shen, D. Y.; Xu, J. Chin. J. Poly. Sci. 2002, 20, 573-577.
Burns, G.T.; Taylor, R. B.; Xu, Y.; Zangvil, A.; Zank, G. A. Chem. Mater. 1992, 4, 1313-1323.
Liu, Q.; Wu, H. J.; Lewis, R.; Maciel, G. E.; Interrante, L. V. Chem. Mater. 1999, 11, 2038-2048.
Boury, B.; Corriu, R. J. P.; Douglas, W. E. Chem. Mater. 1991, 3, 487-489.
Monthioux, M.; Delverdier, O. J. Eur. Cer. Society, 1996, 16, 721-737.

*Primary Examiner* — Elvis O Price
(74) *Attorney, Agent, or Firm* — Bereskin and Parr LLP/S.E.N.R.L., s.r.l.; Patricia Folkins (57) ABSTRACT

The present disclosure relates to a method of preparing silicon carbon nanocrystals (SiC-NCs) in a size-dependent manner by reacting a compound of the Formula I: $R^1Si(X^1)_3$, with a compound of the Formula II $Si(X^2)_4$(II) under conditions for the hydrolysis and condensation of the compound of the Formula I and the compound of the Formula II to form a siloxane polymer comprising repeating units of the Formula III: $-[(R^1SiO_{1.5})_x(SiO_2)_y]-$, followed by thermal processing of the siloxane polymer under conditions to form SiC-NC's. Optionally the SiC-NC's are liberated to provide free standing SiC-NC's.

20 Claims, 6 Drawing Sheets

METHOD FOR PREPARING SIZE-CONTROLLED SILICON CARBIDE NANCRYSTALS

This application claims the benefit of 35 U.S. §119 based on the priority of co-pending U.S. Provisional Application No. 61/122,798, filed Dec. 16, 2009, the contents of which are herein incorporated herein, in their entirety, by reference.

FIELD OF THE DISCLOSURE

The present disclosure relates to methods for preparing silicon carbide nanocrystals (SiC-NC's) in particular in a sized-controlled manner.

BACKGROUND OF THE DISCLOSURE

Silicon carbide (SiC) is a very important material for many high-performance applications as a result of its exceptional electronic, physical, and chemical properties. Its wide band gap, high strength, thermal stability, and chemical inertness have led many to regard SiC as a promising substitute for silicon for high power, high temperature, high frequency electronics.[1-6] These properties also make SiC ideal for integration into microelectromechanical systems (MEMS) for harsh environment sensing applications.[7] As with many other materials, the current decades-long trend towards size reduction to nanoscale dimensions has led to a variety of new applications for SiC, arising from the emergence of size-dependent properties not found in the bulk material, as well as the increased surface area leading to greater interfacial areas and interactions.

Similar to other Group IV semiconductor nanocrystals such as silicon (Si) and germanium (Ge), SiC nanocrystals (SiC-NCs) have shown tremendous potential for optoelectronic applications as a result of their size-dependent optical and electronic properties.[1] The confinement of charge carriers in semiconductor nanocrystals and resulting enhancement of the probability of radiative recombination, known as quantum confinement, is an effective method for tailoring photoluminescence (PL) properties in size-controlled nanocrystals. This strategy has been applied to Si and Ge nanocrystals that have exhibited PL maxima spanning the near infrared (NIR) and visible spectrum.[8-10] Recently, similar successes in realizing control and increased stability of blue and UV PL from SiC-NCs,[11-14] spectral regions not easily accessed with Si-based systems, have demonstrated the potential for SiC in PL applications in this spectral regime. Furthermore, the stability of SiC-NC photoluminescence in aqueous media[15] together with its biocompatibility[16] make them ideal for biological fluorescence imaging ideal for heterogeneous catalyst supports.[21]

The most common approach for the preparation of SiC-NCs involves the electrochemical etching of bulk SiC wafers to yield porous SiC,[11] from which isolated nanocrystals can be obtained after grinding[17] or sonication.[1, 12, 13] These and other synthetic approaches, including ion implantation, thermal processing of $C_{60}$-loaded porous Si, and chemical vapour deposition have recently been reviewed.[1]

For many applications, the production of size selected nanocrystals is vital. The size-dependence on PL wavelength is well established, with the consequence that specific nanocrystal sizes with small size polydispersity are required for narrow emission bands at the desired wavelength. It has also been shown that the Young's modulus and strength of particulate-polymer composites are strongly dependent on nanocrystal size below a diameter of ca. 20 nm,[22] further highlighting the importance of narrow size distributions. Ironically, the thermodynamic stability of SiC that gives rise to many of its desirable properties also imposes synthetic challenges for the production of size-controlled SiC-NCs. In particular, typical size tuning approaches used for analogous Si-based systems, especially chemical etching, are not as accessible to SiC. Nevertheless, with a suitable synthetic approach, size control can be achieved in situ during nanocrystal formation and growth. This has been demonstrated with the formation of SiC-NCs from laser pyrolysis of gaseous mixtures[23] and from the electrochemical etching of SiC wafers.[1, 13]

Ceramic prepolymers such as, polyorganosiloxanes (or polysilsesquioxanes)[24, 33, 34] and polycarbosilanes,[35-37] have been studied as precursors to SiC.

SUMMARY OF THE DISCLOSURE

Silicon carbide (SiC) has become a very important material for many high-performance applications as a result of its exceptional material properties. The emergence of size-dependent properties in SiC nanocrystals (SiC-NCs), together with the increased surface area intrinsic to nanocrystals, has led to a variety of new possible applications, including optoelectronics and hybrid materials. Herein is reported the straightforward preparation of size-controlled oxide-embedded and freestanding SiC-NCs from the reductive thermal processing of compositionally-controlled phenylsiloxane polymers. Compositional tuning of the polymers is achieved by varying the relative amounts of the polymer precursors, for example of phenyl trichlorosilane ($C_6H_5SiCl_3$) and silicon tetrachloride ($SiCl_4$), during hydrolysis and co-condensation. Thermal processing of the resulting compositionally-controlled condensation copolymers yields oxide-embedded SiC-NCs whose average diameter is dependent on the relative organic precursor concentration in the initial precursor mixture. A liberation procedure involving oxidation of matrix carbon and subsequent chemical etching of the matrix is also presented to prepare size-controlled freestanding SiC-NCs.

Accordingly, the present disclosure includes a method of preparing SiC-NCs comprising:

(a) reacting a compound of the Formula I:

$$R^1Si(X^1)_3 \quad\quad\quad (I)$$

wherein $R^1$ is selected from $C_{1-10}$alkyl and $C_{6-14}$aryl; and each $X^1$ is independently selected from Cl, Br, I and $OC_{1-10}$alkyl, with a compound of the Formula II:

$$Si(X^2)_4 \quad\quad\quad (II)$$

each $X^2$ is independently selected from Cl, Br, I and $OC_{1-10}$alkyl, under conditions for the hydrolysis and condensation of the compound of the Formula I and the compound of the Formula II to form a siloxane polymer comprising repeating units of the Formula III:

$$-[(R^1SiO_{1.5})_x(SiO_2)_y]- \quad\quad\quad (III)$$

wherein $R^1$ is as defined above and x and y represent the molar ratio of $R^1SiO_{1.5}$ to $SiO_2$ as determined by amounts of the Formula I and the compound of the Formula II used in the hydrolysis and condensation reaction; and (b) thermal processing the siloxane polymer comprising repeating units of the Formula III under conditions to form SiC-NCs; and (c) optionally liberating the SiC-NCs to provide freestanding SiC-NCs, wherein each alkyl and aryl in $R^1$, $X^1$, and $X^2$ is independently unsubstituted or substituted with one or more halo.

In an embodiment of the disclosure, the molar ratio of the compound of Formula I to the compound of Formula II in step (a) controls the size of the resulting SiC-NCs.

In a further embodiment of the present disclosure, the SiC-NCs are further treated under conditions to incorporate functional groups on to the surface. In yet another embodiment, the surface modification changes the photoluminescent, mechanical and/or thermal properties of SiC-NCs.

Other features and advantages of the present disclosure will become apparent from the following detailed description. It should be understood, however, that the detailed description and the specific examples while indicating embodiments of the disclosure are given by way of illustration only, since various changes and modifications within the spirit and scope of the disclosure will become apparent to those skilled in the art from this detailed description.

BRIEF DESCRIPTION OF THE DRAWINGS

The disclosure will now be described in greater detail with reference to the following drawings in which.

DETAILED DESCRIPTION OF THE DISCLOSURE (I) Definitions

The term "$C_{1-10}$alkyl" as used herein refers to straight or branched chain alkyl groups containing 1, 2, 3, 4, 5, 6, 7, 8, 9 or 10 carbon atoms and includes, for example, methyl, ethyl, n-propyl, isopropyl, n-butyl, isobutyl, t-butyl, n-pentyl, n-hexyl, isopentyl, and the like.

The term "$C_{6-14}$aryl" as used herein refers to cyclic hydrocarbons containing 6 to 14 carbon atoms and at least one phenyl group and includes phenyl, naphthyl, tetrahydronaphthylene and dihydroindenyl and the like.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

(II) Methods of the Disclosure

Figure 6:
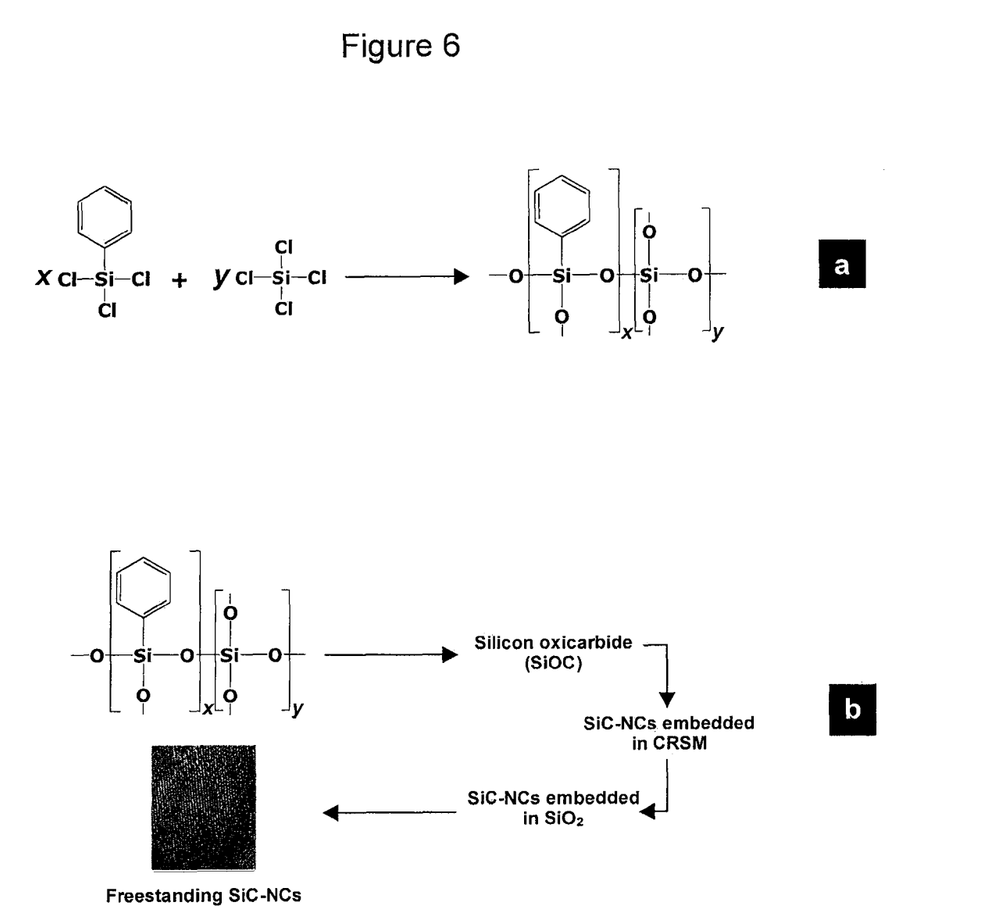
FIG. 6: Synthetic outline for the preparation of size-controlled SiC-NCs from compositionally-controlled phenylsiloxane polymers. a, Hydrolysis and co-condensation of varying mixtures of $C_6H_5SiCl_3$ and $SiCl_4$ yields compositionally-controlled phenylsiloxane polymers, $[(C_6H_5SiO_{1.5})_x(SiO_2)_y]_n$. b, Reductive thermal processing of $[(C_6H_5SiO_{1.5})_x(SiO_2)_y]_n$ polymers yields CRSM-embedded SiC-NCs. Subsequent oxidation of matrix carbon and chemical etching of the $SiO_2$ matrix yields freestanding size-controlled SiC-NCs.

In the present disclosure, a new, straightforward, readily scalable method for the synthesis of size-controlled SiC-NCs via the thermal processing of compositionally-controlled phenylsiloxane polymers is reported. In brief, pre-determined molar ratios of polymer precursors, e.g. phenyl trichlorosilane ($C_6H_5SiCl_3$) and silicon tetrachloride ($SiCl_4$), were combined and polymerized by a standard sol-gel approach to produce phenylsiloxane polymers of tuned composition, for e.g. $[(C_6H_5SiO_{1.5})_x(SiO_2)_y]_n$ (FIG. 6a). Controlled thermal processing of these polymers led to the formation of an amorphous silicon oxicarbide network, which underwent bond rearrangement to yield SiC-NCs embedded in a carbon-rich silica matrix (CRSM). Nanocrystal dimensions were found to depend directly upon the relative concentration of $C_6H_5SiCl_3$, the organic precursor, e.g. in the initial polymerization mixture. A liberation procedure involving the thermal oxidation of matrix carbon followed by etching the $SiO_2$ matrix has also been developed to effectively liberate size-controlled freestanding SiC-NCs (FIG. 6b).

Accordingly, the present disclosure includes a method of preparing SiC-NCs comprising:
(a) reacting a compound of the Formula I:

$$R^1Si(X^1)_3 \quad (I)$$

wherein $R^1$ is selected from $C_{1-10}$alkyl and $C_{6-14}$aryl; and each $X^1$ is independently selected from Cl, Br, I and $OC_{1-10}$alkyl, with a compound of the Formula II:

$$Si(X^2)_4 \quad\quad (II)$$

each $X^2$ is independently selected from Cl, Br, I and $OC_{1-10}$alkyl, under conditions for the hydrolysis and condensation of the compound of the Formula I and the compound of the Formula II to form a siloxane polymer comprising repeating units of the Formula III:

$$—[(R^1SiO_{1.5})_x(SiO_2)_y]— \quad\quad (III)$$

wherein $R^1$ is as defined above and x and y represent the molar ratio of $R^1SiO_{1.5}$ to $SiO_2$ as determined by amounts of the Formula I and the compound of the Formula II used in the hydrolysis and condensation reaction; and (b) thermal processing the siloxane polymer comprising repeating units of the Formula III under conditions to form SiC-NCs; and (c) optionally liberating the SiC-NCs to provide freestanding SiC-NCs, wherein each alkyl and aryl in $R^1$, $X^1$, and $X^2$ is independently unsubstituted or substituted with one or more halo.

In an embodiment of the disclosure, the molar ratio of the compound of Formula I to the compound of Formula II in step (a) controls the size of the resulting SiC-NCs. In a further embodiment, the larger the molar ratio of the compound of Formula I to the compound of Formula II (i.e. the more compound of Formula I that is used), the larger the resulting SiC-NCs.

In another embodiment, $R^1$ is selected from $C_{1-6}$alkyl and $C_{6-10}$aryl, and each $X^1$ is independently (i.e. the same or different) selected from Cl, Br, I and $OC_{1-6}$alkyl. In a further embodiment $R^1$ is $C_{6-10}$aryl and each $X^1$ is the same. In a further embodiment $R^1$ is phenyl.

In a further embodiment, each $X^2$ is the same and is selected from Cl, Br, I and $OC_{1-6}$alkyl.

In another embodiment each alkyl and aryl in $R^1$, $X^1$ and $X^2$ is independently unsubstituted or substituted with one or more, one to six, one to five, one to four, one to three, one to two or one fluoro.

In a further embodiment each alkyl and aryl in $R^1$, $X^1$ and $X^2$ is unsubstituted.

In another embodiment of the present disclosure, the conditions for the hydrolysis and condensation of the compound of the Formula I and the compound of the Formula II to form a siloxane polymer comprise standard sol gel reaction conditions, for example, combining the compound of the Formula I and the compound of Formula II and adding an aqueous alcoholic solution to initiate the hydrolysis and condensation reaction at a temperature of about −20° C. to about 0° C., for example about −10° C., in an inert atmosphere, for example under argon. In an embodiment the alcohol is isopropyl alcohol (IPA) and the aqueous solution comprises about 40% to about 80% (v/v), for example about 65% (v/v) of IPA. In another embodiment, the volume of aqueous alcohol solution added is adjusted to maintain a constant $H_2O$ to $X^1+X^2$ ratio for each polymer composition. Following addition of the aqueous alcohol solution the reaction mixture is stirred for an extended period of time, for example for about 12 to about 48 hours, with optional warming, for example, to a temperature of about 40° C. to about 80° C., to allow the condensation reaction to proceed as far as possible.

In an embodiment of the present disclosure, the thermal processing of the siloxane polymer comprising repeating units of the Formula III under conditions to form SiC-NCs comprise (i) thermally processing the siloxane polymer under conditions to form silicon oxicarbide (SiOC): (ii) thermally processing the silicon oxicarbide under conditions to form SiC-NCs embedded in a carbon-rich silica matrix (CRSM); and (iii) thermally processing the SiC-NC's embedded in a CRSM under conditions to form SiC-NCs embedded in a $SiO_2$ matrix. In a further embodiment, the conditions in (i) comprise heating the siloxane polymer at a temperature of about 1000° C. to about 1200° C., for example about 1100° C., under a slightly reducing atmosphere, for example in argon comprising about 1% to about 10%, for example about 5%, $H_2$, for about 0.5 hr to about 2 hr, for example 1 hr. In a further embodiment, the conditions in (ii) comprise heating the SiOC at a temperature of about 1300° C. to about 1500° C., for example about 1400° C., under an inert atmosphere, for example in argon, for about 1 hr to about 3 hr, for example 2 hr. In a further embodiment, the conditions in (iii) comprise heating the SiC-NC's embedded in a CRSM at a temperature of about 500° C. to about 800° C., for example about 650° C., in air for about 10 min to about 1 hr, for example 30 min.

In another embodiment, the conditions for liberating the SiC-NCs comprise chemical etching of the SiC-NCs embedded in the $SiO_2$ matrix with an aqueous alcoholic solvent comprising HF.

In a further embodiment of the present disclosure, the SiC-NCs are further treated under conditions to incorporate functional groups on to the surface. In yet another embodiment, the surface modification changes the photoluminescent, mechanical and/or thermal properties of SiC-NCs. In yet another embodiment, surface modification is selected from reacting alkenes and organosilanes with surface hydroxyl groups, using Grignard reagents and alkyl or aryl lithium reagents and transition metal mediated dehydrogenative coupling reactions. In another embodiment unsaturated functional groups on the surface are further reacted with diazo groups.

The following non-limiting examples are illustrative of the present disclosure:

Examples

General Information:

Reagents and Materials. Phenyl trichlorosilane ($C_6H_5SiCl_3$, 97%, Aldrich), silicon tetrachloride ($SiCl_4$, 99%, Aldrich), isopropyl alcohol (IPA, ≧99.5%, Fisher), electronic grade hydrofluoric acid (HF, 49% aqueous solution, J. T. Baker), and reagent grade ethanol (95%, Aldrich) were used as received. High-purity DI water (18.2 MΩ/cm) was obtained from a Barnstead Nanopure Diamond purification system.

Example 1

$[(C_6H_5SiO_{1.5})_x(SiO_2)_y]_n$ Polymer Preparation (A1, B1, C1)

In a typical synthesis, pre-determined amounts of $C_6H_5SiCl_3$ and $SiCl_4$ were combined and magnetically stirred under inert Ar atmosphere for 1 hour in a salt water/ice bath (ca. −10° C.). The molar ratio of $C_6H_5SiCl_3$:$SiCl_4$ was adjusted for each sample to obtain polymers of different compositions (Table 1). A 65% (v/v) solution of IPA in DI water was injected through a septum into the cooled mixture with vigorous stirring, using standard Schlenk techniques. IPA was added to the reaction solution to control the condensation reactions by simultaneously decreasing the water concentration and slowing hydrolysis rates by forming alkoxy-substituted intermediates. The volume of aqueous solution added to the mixture was adjusted for each sample to maintain a constant $H_2O:Cl$ ratio for each polymer composition. As the reaction produces $HCl_{(g)}$, an exhaust vent was connected to the reaction flask to prevent over-pressurization. The clear colorless mixture of $C_6H_5SiCl_3$ and $SiCl_4$ immediately turned cloudy white as the IPA solution was added, and hydrolysis of the precursors was confirmed by monitoring the pH of the reaction mixture (pH=1). The cloudy white mixture was stirred for 24 hrs at ambient temperature and subsequently for 3 hours at 70° C. to promote further condensation. The resulting white solid precipitate was isolated by vacuum filtration, washed 3× with DI water, and dried in vacuo. The white solid polymers (A1, B1, C1) were obtained in yields greater than 90%, and are stable under ambient conditions.

Example 2

Bulk Oxide-Embedded SiC-NC Preparation (A2-A4, B2-B4, C2-C4)

$[(C_6H_5SiO_{1.5})_x(SiO_2)_y]_n$ polymers (A1, B1, C1) were placed in quartz reaction boats and transferred to a high-temperature tube furnace. Samples were thermally processed at 1100° C. for 1 hour under slightly reducing atmosphere (5% $H_2$/95% Ar). The resulting glassy black silicon oxicarbide (A2, B2, C2) was subsequently transferred to a vitreous carbon reaction boat and thermally processed at 1400° C. for 2 hours under an inert Ar atmosphere to produce SiC-NCs embedded in a carbon-rich silica matrix (CRSM) (A3, B3, C3). A final thermal processing step involved heating these solids in air at 650° C. for 30 minutes to produce $SiO_2$-embedded SiC-NCs (A4, B4, C4). After cooling to room temperature, the solid composites were mechanically ground in an agate mortar and pestle.

Example 3

Liberation of Freestanding SiC-NCs (A5, B5, C5)

Freestanding SiC-NCs were liberated from the oxide by chemical etching of the $SiO_2$ matrix in a hydrofluoric acid solution. In a typical liberation procedure, 0.05 g of A5, B5, or C5 was magnetically stirred in 3 mL of a 1:1:1 solution of DI water:Ethanol:49% HF for 1 hour. The freestanding SiC-NCs were isolated by centrifugation and washed with DI water and ethanol and dried under a flowing stream of Ar.

Example 4

Fourier Transform Infrared Spectroscopy (FTIR)

FTIR spectroscopy of free-flowing powders of A1-A5, B1-B5, and C1-C5 was performed using a Nicolet Magna 750 IR spectrophotometer.

Example 5

X-Ray Powder Diffraction (XRD)

XRD was performed using an INEL XRG 3000 X-ray diffractometer equipped with a Cu Kα radiation source (λ=1.54 Å). Bulk crystallinity for samples A2-A5, B2-B5, and C2-C5 was evaluated on finely ground samples mounted on a low-intensity background silicon (100) sample holder.

Example 6

X-Ray Photoelectron Spectroscopy (XPS)

XPS analysis was performed using a Kratos Axis Ultra instrument operating in energy spectrum mode at 210 W. The base pressure and operating chamber pressure were maintained at $\leq 10^{-7}$ Pa. A monochromatic Al Kα source (λ=8.34 Å) was used to irradiate the samples, and the spectra were obtained with an electron takeoff angle of 90°. To control sample charging, the charge neutralizer filament was used when required. Survey spectra were collected using an elliptical spot with 2 and 1 mm major and minor axis lengths, respectively, and a 160 eV pass energy with a step of 0.33 eV. CasaXPS™ (Vamas) software was used to process high-resolution spectra. All spectra were internally calibrated to the O 1 s emission (532.9 eV). After calibration, the background from each spectrum was subtracted using a Shirley-type background to remove most of the extrinsic loss structure.

Example 7

Transmission Electron Microscopy (TEM)

High-resolution TEM (HRTEM) was performed at the Brockhouse Institute for Materials Research (BIMR) at McMaster University using a JEOL-2010 field-emission (FE) gun operating at 200 keV. Low-resolution TEM was performed using a JEOL-2010 ($LaB_6$ thermionic emission source) electron microscope operating at 200 keV. TEM samples of freestanding SiC-NCs (A5, C5) were dropcoated from an ethanol suspension onto a carbon-coated copper grid.

Example 8

Surface Modification

Surface modification of freestanding SiC nanocrystals will exploit the surface groups identified by FTIR and XPS characterization of nanocrystals etched by procedures described in Example 3. This includes surface hydroxyl, hydride and unsaturated carbon species. Alkenes and organosilanes are reacted with surface hydroxyl groups, and diazo groups to react with unsaturated carbon species. Also alternative reaction conditions including microwave exposure, organic reagents (e.g., Grignard reagents and RLi), as well as transition metal mediated dehydrogenative coupling reactions are performed.

Results and Discussion.

Polymer Composition

Figure 1:
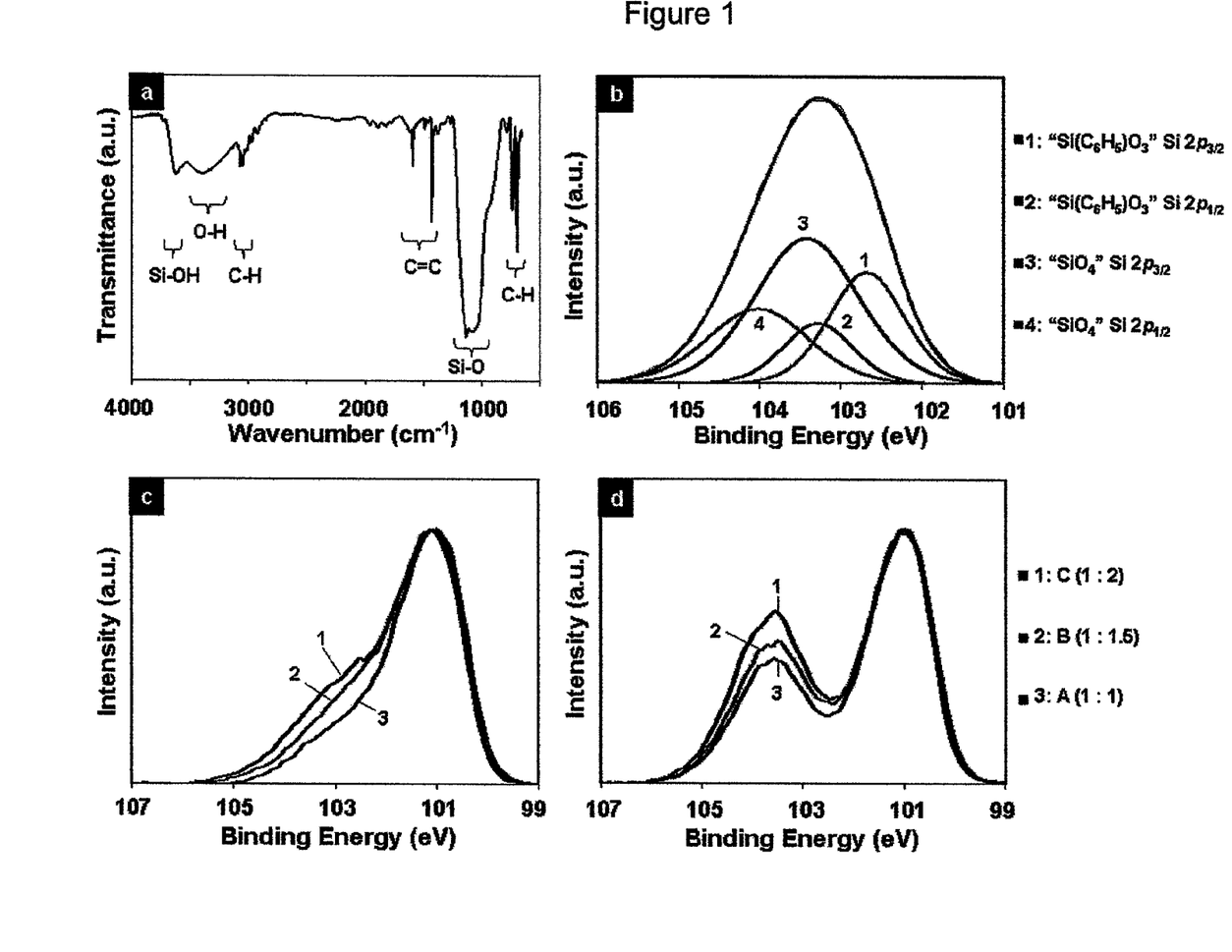
FIG. 1 shows spectroscopic characterization of phenylsiloxane polymers and oxide-embedded SiC-NCs. a, FTIR spectrum of polymer C1, showing characteristic absorptions of phenylsiloxanes. b, High resolution XP spectrum of Si 2p region of polymer C1 fit to $2p_{3/2}$ and $2p_{1/2}$ spin-orbit partner lines of "$C_6H_5SiO_3$" and "$SiO_4$" components, consistent with compositionally-tailored phenylsiloxane. c, High resolution XP spectrum of Si 2p region of CRMS-embedded SiC-NCs (A3, B3, C3). d, High resolution XPS spectrum of Si 2p region of $SiO_2$-embedded SiC-NCs (A4, B4, C4). c and d clearly show the relationship between polymer and composite compositions.

The effect of phenylsiloxane polymer composition (i.e., $C_6H_6SiO_{1.5}$:$SiO_2$ ratio) on SiC-NC diameter was monitored by synthesizing three polymers of decreasing phenyl concentration, such that the molar ratios of $C_6H_5SiCl_3$:$SiCl_4$ were 1:1 (A1), 1:1.5 (B1), and 1:2 (C1) (Table 1). The formation of phenylsiloxanes was confirmed by Fourier transform infrared (FTIR) spectroscopy (FIG. 1a). FTIR spectra of all three polymers (A1, B1, C1) show characteristic aromatic C—H stretching at 3100-3000 $cm^{-1}$, aromatic C=C stretching at 1430 $cm^{-1}$ and 1595 $cm^{-1}$, C—H bending at ca. 695 $cm^{-1}$ and 740 $cm^{-1}$, and intense Si—O—Si stretching modes at ca. 1150 $cm^{-1}$, supporting the formation of phenyl-containing siloxane species, consistent with the proposed hydrolyzed/condensed structures and previous investigations on phenylsiloxanes.[24] The appearance of a broad O—H stretch centered at ca. 3400 cm$^{-1}$ likely arises from uncondensed Si—OH groups, consistent with the absorptions at 3635 cm$^{-1}$ and 3740 cm$^{-1}$ from H-bonded, and isolated silanols, respectively.[25]

X-ray photoelectron spectroscopy (XPS) was performed to further elucidate the composition of the phenylsiloxane polymers by monitoring the Si coordination environments. The Si 2p region of the XP spectra for all three polymers (A1, B1, C1) shows a broad emission centered at 103.2 eV (FIG. 1b) that is readily fit to contributions arising from "Si(C$_6$H$_5$)O$_3$" and "SiO$_4$" species, with Si 2p$_{3/2}$ components centered at 102.7 eV and 103.4 eV, respectively. These are in agreement with reported binding energies for phenylsilicone resin (($C_6H_5SiO_{1.5}$)$_n$) and SiO$_2$,[26] and support the presented FT-IR analysis of the formation of [(C$_6$H$_5$SiO$_{1.5}$)$_x$(SiO$_2$)$_y$]$_n$ condensation polymers.

In order to confirm that varying the monomer ratios in the initial polymerization mixture led to compositional tuning of the polymers, relative changes in the Si coordination environments were monitored by XPS for the matrix-embedded SiC-NCs produced from reductive thermal processing each of the polymers. The Si 2p region of the XP spectra of CRSM-embedded SiC-NCs (A3, B3, C3) (FIG. 1c), as well as the SiO$_2$-embedded SiC-NCs (A4, B4, C4) (FIG. 1d), are dominated by a feature centered at 101 eV, arising from the SiC-NCs.[27] When the spectra were normalized to this SiC feature, the relative intensity of the emission from silicon oxide species, 103-105 eV, clearly increases with SiCl$_4$ concentration in the initial polymerization mixture, with greatest intensity for C3 and C4. These results establish that C1 had the greatest incorporation of SiO$_2$, a direct result of the tailored polymer composition.

Size Control of Oxide-Embedded SiC-NCs

Figure 2:
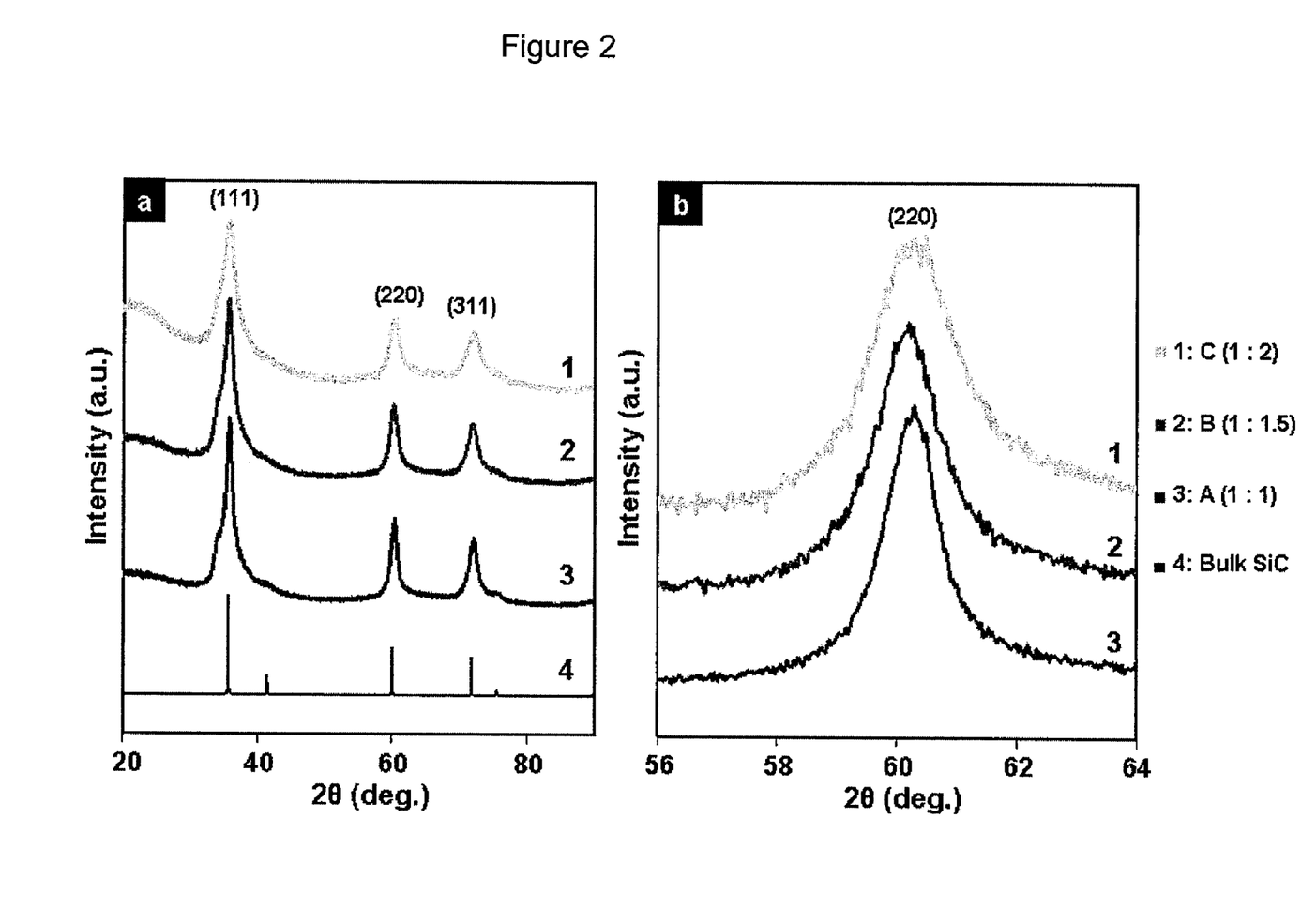
FIG. 2 shows X-ray diffraction characterization of oxide-embedded SiC-NCs and evidence for size tunability based on phenylsiloxane composition. a, XRD pattern of CRSM-embedded SiC-NCs (A3, B3, C3) showing reflections characteristic of β-SiC. b, XRD pattern highlighting (220) reflection of CRSM-embedded SiC-NCs (A3, B3, C3) that clearly show crystal size control as a result of compositionally-tailored polymers.

The effect of precursor polymer composition on the average diameter of oxide-embedded SiC-NCs was evaluated by X-ray diffraction (XRD). Powder diffraction patterns of CRSM-embedded SiC-NCs (A3, B3, C3) (FIG. 2a) are characterized by broad reflections centered at ca. 36°, 60°, and 72°, that are readily indexed to the (111), (220), and (311) crystal planes of β-SiC.[28] From this, it is apparent that broadening of the reflections from SiC-NCs increases as polymer phenyl concentration decreases (i.e., A3 to C3). This trend is clearly evident when evaluating the (220) reflection (FIG. 2b). An estimate of particle size was obtained using Scherrer analysis of XRD peak broadening, which provides mean SiC-NC diameters of ca. 9 nm (A3), 7 nm (B3), and 5 nm (C3). Clearly, the size of SiC-NCs produced by this method is effectively controlled by the phenylsiloxane polymer composition. This trend is also clearly evident in the TEM analysis of liberated SiC-NCs (vide infra).

Matrix Liberation of SiC-NCs

Figure 3:
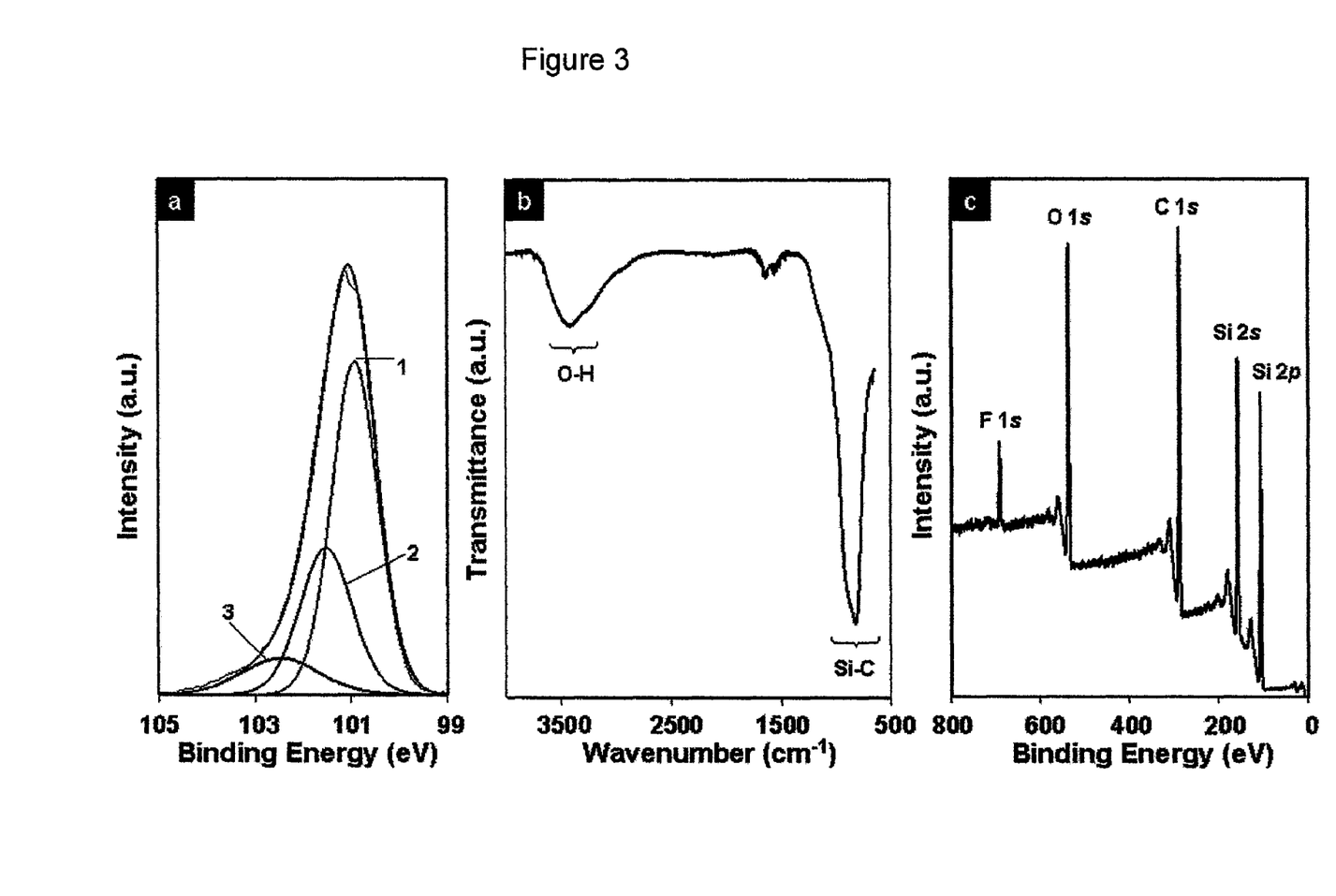
FIG. 3 shows spectroscopic characterization of freestanding SiC-NCs. a, High-resolution XP spectrum of Si 2p region of freestanding SiC-NCs (C5) fit to $2p_{3/2}$ (■) and $2p_{1/2}$ (■) spin-orbit partner lines of SiC and a high-energy component ( ) attributed to surface oxide, hydroxide, and fluoride species. b, FTIR spectrum of freestanding SiC-NCs (C5), showing Si—C TOP vibration and O—H stretch attributed to surface hydroxides. c, Survey XP spectrum of Si 2p region of freestanding SiC-NCs (C5), showing the presence of fluoride and oxide species.

Many potential applications of SiC-NCs require freestanding particles, and as such an oxide liberation procedure was developed, involving the thermal oxidation of graphitic carbon in the CRSM followed by hydrofluoric acid (HF) etching of SiO$_2$. It is known that SiC is thermally stable and unaffected by HF under the present conditions,[29] thus this liberation procedure did not compromise the SiC crystallinity or result in any detectable change in SiC-NC dimensions. The Si 2p region of the XP spectrum (FIG. 3a) of liberated SiC-NCs (C5) is dominated by an emission centered at 101 eV, consistent with SiC.[27] After fitting to the Si 2p$_{3/2}$ and 2p$_{1/2}$ spin-orbit partner lines, a low intensity shoulder remains on the high energy side of this feature, centered at 102.6 eV. This component is attributed to mixed surface species arising from the HF etching procedure and post-etching oxidation (vide infra).

Electrochemical etching of SiC in aqueous HF solutions has been shown to result in complex surface chemistry, including oxide, hydroxide, fluoride, and hydride species.[30-32] The FTIR spectrum of liberated SiC-NCs (C5) (FIG. 3b), clearly shows the dominant SiC transverse optical phonon (TOP)[27] centered at 835 cm$^{-1}$, a broad O—H stretch centered at ca. 3400 cm$^{-1}$, and a shoulder at ca. 1100 cm$^{-1}$ from Si—O species. It is unlikely that this low intensity feature arises from incomplete etching of the oxide matrix, but rather to a post etch surface oxidation species. In this regard, it is reasonable that surface Si—H species oxidize during post-etch workup. The presence of fluorine in the survey XP spectrum of liberated SiC-NCs (FIG. 3c) also suggests partial fluoride surface-termination as a result of HF treatment. These results indicate the present liberated SiC-NCs possess complex surface chemistry. To effectively interface the nanocrystals with application-specific environments (e.g., polymer matrices or an aqueous biological system) a detailed understanding and an ability to control the SiC-NC surface chemistry is desirable. This is the subject of ongoing study in our laboratory. A hydroxylated SiC crystal surface is one candidate currently being explored that has already proven to be a useful platform for subsequent chemical derivitization for bulk systems.[30, 31]

Figure 4:
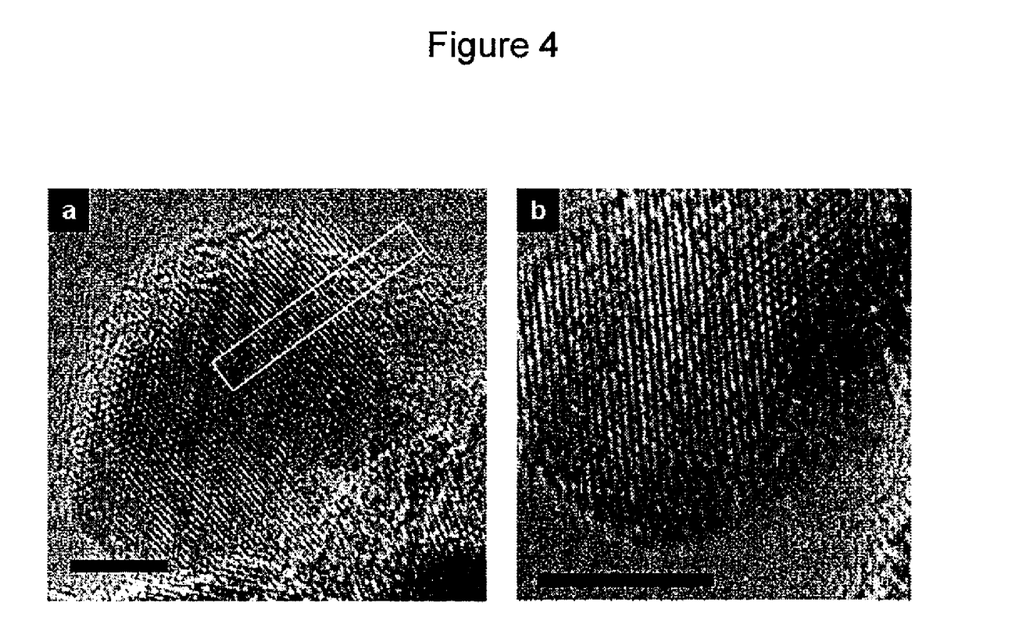
FIG. 4 shows high-resolution transmission electron microscopy of freestanding SiC-NCs. a, HRTEM image of liberated SiC-NCs (A5) with a measured diameter of ca. 10 nm showing lattice fringes consistent with crystalline SiC. The enclosed area was used to calculate average crystal lattice spacing (2.5 Å). b, HRTEM imaged of liberated SiC-NCs (C5) with a measured diameter of ca. 6 nm also showing lattice fringes consistent with crystalline SiC. All scale bars=5 nm.

The SiC-NC size control achieved through variations to polymer composition can be directly observed by examining the high-resolution transmission electron micrographs (HR-TEM) of the liberated nanocrystals (A5, C5) (FIG. 4a, 4b). It is clear that the pseudospherical nanocrystals differ significantly in their diameter, with measured sizes of ca. 10 nm and 6 nm for A5 and C5, respectively. Measured crystal lattice spacing for both samples (2.5 Å) was readily indexed to the (111) crystal plane of β-SiC. The presence of a non-crystalline shell surrounding the crystalline core of the SiC-NCs is consistent with the formation of an amorphous surface species that results from etching and subsequent oxidation. Size distributions for A5, B5, and C5 were obtained from low resolution TEM and determined to be 8.9 nm (n=150, σ=1.1 nm), 6.8 nm (n=150, σ=1.0 nm), and 5.5 nm (n=150, σ=0.8 nm), respectively. These measured values are in excellent agreement with XRD size analysis (vide supra) and highlight the narrow size distributions obtained through this method.

Thermal Transformation Pathway

Figure 5:
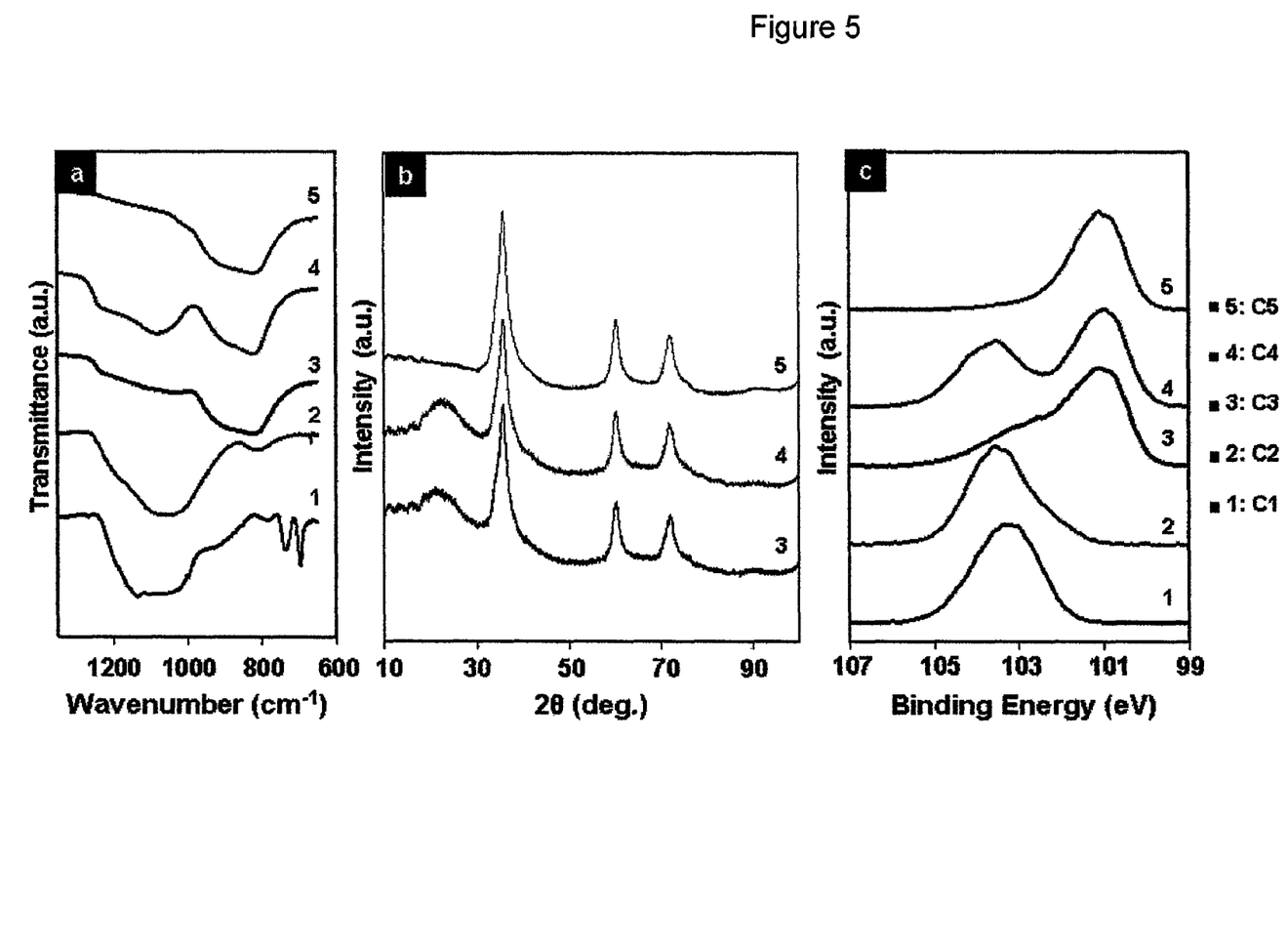
FIG. 5 shows characterization of the mechanism of SiC-NC formation from phenylsiloxane polymers and subsequent oxide liberation. a, Evolution of FTIR spectra, b, XRD patterns, and c, high-resolution XP spectra of Si 2p region for the $C_6H_5SiCl_3$:$SiCl_4$=1:2 (C) system at various stages in the formation and liberation of SiC-NCs.

The mechanism that leads to SiC-NC formation from the thermal processing of the phenylsiloxane polymers of the present disclosure was investigated by following the evolution of FTIR, XRD, and XP spectra for the C$_6$H$_5$SiCl$_3$:SiCl$_4$=1:2 (C) system. For clarity, this evolution is presented in 5 stages.

1) As previously mentioned, the FTIR spectrum (FIG. 5a) of the unprocessed polymer (C1) is dominated by Si—O—Si stretching centered at ca. 1150 cm$^{-1}$ and characteristic phenyl vibrational modes. The XP spectrum (FIG. 5c) shows a single broad emission centered at ca. 103 eV that can be fit to Si species made up of Si tetrahedrally bonded to 4 oxygen atoms (103.4 eV), and 3 oxygen atoms and an sp$^2$-hybridized carbon (102.7 eV), consistent with a [(C$_6$H$_5$SiO$_{1.5}$)$_x$(SiO$_2$)$_y$]$_n$ composition.

2) Thermal processing at 1100° C. in a slightly reducing atmosphere (5% H$_2$/95% Ar) (C2) is accompanied by a decrease and eventual loss of all IR absorptions associated with phenyl functionalities and a broadening of the Si—O—Si stretching mode (FIG. 5a). Similar observations have been reported for pyrolysis of polyphenylsilsesquioxane and have been attributed to thermal decomposition of phenyl groups and a breakdown of the well-defined Si—O—Si backbone structure into a disorganized extended silicon oxicarbide network.[33] At this stage of the present synthesis, the XRD pattern (FIG. 5b) shows no evidence of crystalline phases. The XP spectrum (FIG. 5c) shows a broadening of the Si 2p spectral feature and a slight shift to higher binding energies, attributed to the array of tetrahedrally bonded silicon species present in the oxicarbide network.

3) Increasing the processing temperature to 1400° C. in an inert Ar atmosphere (C3) leads to the emergence of an absorption centered at ca. 835 cm$^{-1}$ in the FTIR spectrum (FIG. 5a), characteristic of the transverse optical phonon (TOP) in SiC.[27] A low intensity Si—O—Si absorption band is also observed, arising from silicon oxide species in the matrix. The XRD pattern (FIG. 5b) shows broad reflections centered at ca. 36°, 60°, and 72°, that are readily indexed to the (111), (220), and (311) crystal planes of β-SiC. A broad spectral feature centered at ca. 20° characteristic of amorphous $SiO_2$ is also observed. The emergence of an intense feature centered at ca. 101 eV in the XP spectrum (FIG. 5c) is consistent with the formation and phase segregation of crystalline SiC, while the broad high-energy shoulder is attributed to the silicon oxide in the matrix.

4) Thermal processing at 650° C. in air (C4) causes a relative increase in intensity of the Si—O—Si absorption band in the FTIR spectrum (FIG. 5a) that arises from the simultaneous oxidation of graphitic carbon in the matrix, evolved as $CO_2$, and a transformation of the matrix to amorphous $SiO_2$. Heating in air does not alter the SiC-NC diameter, evidenced by the unchanged breadth of the XRD reflections (FIG. 5b). Also noted is an increase in intensity of features assigned to amorphous $SiO_2$ in the XRD pattern and XP spectrum (FIG. 5c).

5) Liberation of freestanding SiC-NCs (C5) through HF etching of the $SiO_2$ matrix is characterized by a near-complete loss of the Si—O—Si band in the FTIR spectrum (FIG. 5a). A low intensity shoulder at ca. 1100 cm$^{-1}$ is attributed to slight surface oxidation. As expected, chemical etching of $SiO_2$ is accompanied by the loss of the feature at ca. 20° in the XRD pattern (FIG. 5b) and the loss of the $SiO_2$ spectral feature at 103.4 eV in the XP spectrum (FIG. 5c).

The present results agree with the accepted mechanisms describing the thermally-induced transformations leading to the formation of SiC from polyorganosiloxanes (i.e., sequential decomposition, bond rearrangement, and phase segregation). Initial pyrolytic decomposition of organic fragments up to temperatures of 1000-1200° C. produces an amorphous silicon oxicarbide (SiOC) network consisting of sp$^3$ hybridized carbon[24] and all possible forms of tetrahedrally bonded silicon ($SiC_4$, $SiC_3O$, $SiC_2O_2$, $SiCO_3$, and $SiO_4$) (equation (1)).[34]

$$2RSiO_{1.5} \rightarrow R_2SiO + SiO_2$$

$$R_2SiO + RSiO_{1.5} \rightarrow R_2SiO_{0.5} + SiO_2$$

$$R_2SiO_{0.5} + RSiO_{1.5} \rightarrow R_4SiO + SiO_2 \quad (1)$$

Subsequent thermal processing up to 1400° C. induces continued bonding rearrangement, leading to phase segregation of crystalline SiC, amorphous $SiO_2$, and disordered graphitic (sp$^2$) carbon.[24,34] This process is driven by the thermodynamic stability of SiC and $SiO_2$. It should be noted that in this temperature range (≦1400° C.), carbothermal reduction is not the primary pathway in the production of SiC. While formation of crystalline SiC nanodomains through these reactions has been identified,[24] this transformation has not been exploited, until now, for the production of size-controlled matrix-embedded as well as freestanding SiC-NCs.

Controlling the amount of carbon available in the amorphous SiOC network through phenyl content provides a direct pathway to influence the formation and growth of crystalline SiC. Furthermore, by diluting the silicon and carbon with additional matrix elements (i.e., $SiO_2$) on a molecular scale, the bond rearrangements and solid state diffusion processes leading to phase segregation can generate smaller crystalline domains of SiC. This strategy has been successfully demonstrated by copolymerizing a "matrix $SiO_2$" generating monomer ($SiCl_4$) and a "SiC" generating monomer ($PhSiCl_3$). By varying the relative concentrations of these monomers during polymerization, polymers of controlled composition were produced, leading to composites of tailored carbon concentrations and ultimately to size-controlled SiC-NCs. In short, increased carbon content in the parent polymer leads to larger SiC-NCs. A liberation procedure was also developed to produce freestanding size-controlled SiC-NCs. The freestanding SiC-NCs described in this disclosure did not exhibit PL, as a result of a combination of factors including complex surface chemistry and the relatively large crystal size.[1] It is expected that smaller diameter nanocrystals will possess light emission properties. Owing to the straightforward nature of the present procedure and the size control achievable through this approach, the method of the present disclosure will significantly contribute to current endeavors aimed at incorporating size-controlled SiC-NCs into device applications.

It is important to note that the surface chemistry of SiC surfaces, including nanocrystals, has been observed to be very complex. Various etching procedure may provide further size control and a surface species that can be preferentially induced for subsequent reaction.

Surface-modification may affect the PL propertied of the functionalized SiC nanocrystals. As well, improved nanocrystal dispersity on the mechanical and thermal properties of polymer nanocomposites, such as higher tensile strength and thermal stability, may be affected. The superior size control and large scale of the present synthetic technique will greatly assist in the development and understanding of SiC nanocrystalline surfaces.

TABLE 1

Compositionally-controlled phenylsiloxane polymers. Experimental details for the preparation of compositionally-controlled [($(C_6H_5SiO_{1.5})_x(SiO_2)_y)]_n$ polymers from the hydrolysis and condensation of phenyl trichlorosilane () and silicon tetrachloride ().

| Sample | Composition (mol $C_6H_5SiCl_3$:mol $SiCl_4$) | Volume $C_6H_5SiCl_3$ (mL) | Volume $SiCl_4$ (mL) | Volume 65% (v/v) IPA in DI water (mL) |
|---|---|---|---|---|
| A1 | 1:1 | 2.8 (17.5 mmol) | 2.0 (17.5 mmol) | 16.0 |
| B1 | 1:1.5 | 2.8 (17.5 mmol) | 3.0 (26.3 mmol) | 20.5 |
| C1 | 1:2 | 2.8 (17.5 mmol) | 4.0 (35.0 mmol) | 25.0 |

TABLE 2

Sample details in the preparation of SiC-NCs from phenylsiloxane polymers. Sample list and experimental details for the preparation of liberated SiC-NCs from compositionally-controlled $[(C_6H_5SiO_{1.5})_x(SiO_2)_y]_n$ polymers.

| Sample | Precursor and Processing Conditions | Remarks |
|---|---|---|
| A2 | A1, 1100° C., 1 hr, 5% $H_2$/95% Ar | Amorphous oxicarbide network |
| B2 | B1, 1100° C., 1 hr, 5% $H_2$/95% Ar | Amorphous oxicarbide network |
| C2 | C1, 1100° C., 1 hr, 5% $H_2$/95% Ar | Amorphous oxicarbide network |
| A3 | A2, 1400° C., 2 hrs, Ar | SiC-NCs in CRSM |
| B3 | B2, 1400° C., 2 hrs, Ar | SiC-NCs in CRSM |
| C3 | C2, 1400° C., 2 hrs, Ar | SiC-NCs in CRSM |
| A4 | A3, 650° C., 30 mins, air | SiC-NCs in $SiO_2$ matrix |
| B4 | B3, 650° C., 30 mins, air | SiC-NCs in $SiO_2$ matrix |
| C4 | C3, 650° C., 30 mins, air | SiC-NCs in $SiO_2$ matrix |
| A5 | A4, HF etching, 1 hr | Liberated SiC-NCs |
| B5 | B4, HF etching, 1 hr | Liberated SiC-NCs |
| C5 | C4, HF etching, 1 hr | Liberated SiC-NCs |

FULL CITATIONS FOR DOCUMENTS REFERRED TO IN THE SPECIFICATION

1. Fan, J. Y.; Wu, X. L.; Chu, P. K. *Prog. Mater. Sci.* 2006, 51, 983-1031.
2. Mélinon, P.; Masenelli, B.; Tournus, F.; Perez, A. *Nature Mat.* 2007, 6, 479-490
3. Bhatnagar, M.; Baliga, B. J. *IEEE Trans. Electron Devices.* 1993, 40, 645-655
4. Nakamura, D.; Gunjishima, I.; Yamaguchi, S.; Ito, T.; Okamoto, A.; Kondo, H.; Onda, S.; Takatori, K. *Nature.* 2004, 430, 1009-1012.
5. Willander, M.; Friesel, M.; Wahab, Q. U.; Straumal, B. *J. Mater. Sci.* 2006, 17, 1-25.
6. Harris, C. I.; Savage, S.; Konstantinov, A.; Bakowski, M.; Ericsson, P. *Appl. Surf. Sci.* 2001, 184, 393-398.
7. Mehregany, M.; Zorman, C. A.; Rajan, N.; Wu, C. H. *Proc. of IEEE.* 1998, 86, 1594-1609.
8. Hessel, C. M.; Henderson, E. J.; Veinot, J. G. C. *Chem. Mater.* 2006, 18, 6139-6146.
9. Hessel, C. M.; Henderson, E. J.; Veinot, J. G. C. *J. Phys. Chem. C.* 2007, 111, 6956-6961.
10. Henderson, E. J.; Hessel, C. M.; Veinot, J. G. C. *J. Am. Chem. Soc.* 2008, 130, 3624-3632.
11. Morales Rodriguez, M.; Díaz Cano, A.; Torchynska, T. V.; Polupan, G.; Ostapenko, S. *J. Non-Cryst. Solids.* 2008, 354, 2272-2275.
12. Rossi, A. M.; Murphy, T. E.; Reipa, V. *Appl. Phys. Lett.* 2008, 92, 253112.
13. Wu, X. L.; Fan, J. Y.; Qiu, T.; Yang, X.; Siu, G. G.; Chu, P. K. *Phys. Rev. Lett.* 2005, 94, 026102.
14. Fan, J. Y.; Wu, X. L.; Li, H. X.; Liu, H. W.; Siu, G. G.; Chu, P. K. *Appl. Phys. Lett.* 2006, 88, 041909.
15. Fan, J. Y.; Wu, X. L.; Zhao, P. Q.; Chu, P. K. *Phys. Lett. A.* 2006, 360, 336-338.
16. Yakimova, R.; Petoral, R. M.; Yazdi, G. R.; Vahiberg, C.; Lloyd Spetz, A.; Uvdal, K. *J. Phys. D.* 2007, 40, 6435-6442.
17. Botsoa, J.; Lysenko, V.; Géloën, A.; Marty, O.; Bluet, J. M.; Guillot, G. *Appl. Phys. Lett.* 2008, 92, 173902.
18. Fan, J.; Li, H.; Jiang, J.; So, L. K. Y.; Lam, Y. W.; Chu, P. K. *Small.* 2008, 4, 1058-1062.
19. Guo, Z.; Kim, T. Y.; Lei, K.; Pereira, T.; Sugar, J. G.; Hahn, H. T. *Comp. Sci. Tech.* 2008, 68, 164-170.
20. Rodgers, R. M.; Mahfuz, H.; Rangari, V. K.; Chisholm, N.; Jeelani, S. *Macromol. Mater. Eng.* 2005, 290, 423-429.
21. Ledoux, M. J.; Pham-Huu, C. *CATTECH.* 2001, 5, 226-246.
22. Fu, S.-Y.; Feng, X.-Q.; Lauke, B.; Mai, Y.-W. *Comp. Part B.* 2008, 39, 933-961
23. Herlin-Boime, N.; Vicens, J.; Dufour, C.; Ténégal, F.; Reynaud, C.; Rizk, R. *J. Nano. Res.* 2004, 6, 63-70.
24. Hurwitz, F. I.; Heimann, P.; Farmer, S. C.; Hembree Jr, D. M. *J. Mater. Sci.* 1993, 28, 6622-6630.
25. Van Le, T.; Ross, E. E.; Velarde, T. R. C.; Legg, M. A.; Wirth, M. J. *Langmuir.* 2007, 23, 8554-8559.
26. Wagner, C. D.; Passoja, D. E.; Hillery, H. F.; Kinisky, T. G.; Six, H. A.; Jansen, W. T.; Taylor, J. A. *J. Vac. Sci. Tech.* 1982, 21, 933-944.
27. Avila, A.; Montero, I.; Galán, L.; Ripalda, J. M.; Levy, R. *J. Appl. Phys.* 2001, 89, 212-216.
28. Yang, W.; Miao, H.; Xie, Z.; Zhang, L.; An, L. *Chem. Phys. Lett.* 2004, 383, 441-444.
29. Zhuang, D.; Edgar, J. H. *Mater. Sci. Eng. R.* 2005, 48, 1-46.
30. Rosso, M.; Arafat, A.; Schroën, K.; Giesbers, M.; Roper, C. S.; Maboudian, R.; Zuilhof, H. *Langmuir.* 2008, 24, 4007-4012.
31. Schoell, S. J.; Hoeb, M.; Sharp, I. D.; Steins, W.; Eickhoff, M.; Stutzmann, M.; Brandt, M. S. *Appl. Phys. Lett.* 2008, 92, 153301.
32. Alekseev, S. A.; Zaitsev, V. N.; Botsoa, J.; Barbier, D. *Chem. Mater.* 2007, 19, 2189-2194.
33. Ma, J.; Shi, L. H.; Zhang, J. M.; Li, B. Y.; Shen, D. Y.; Xu, J. Chin. *J. Poly. Sci.* 2002, 20, 573-577.
34. Burns, G. T.; Taylor, R. B.; Xu, Y.; Zangvil, A.; Zank, G. A. *Chem. Mater.* 1992, 4, 1313-1323.
35. Liu, Q.; Wu, H. J.; Lewis, R.; Maciel, G. E.; Interrante, L. V. *Chem. Mater.* 1999, 11, 2038-2048.
36. Boury, B.; Corriu, R. J. P.; Douglas, W. E. *Chem. Mater.* 1991, 3, 487-489.
37. Monthioux, M.; Delverdier, O. *J. Eur. Cer. Society.* 1996, 16, 721-737.

The invention claimed is:
1. A method of preparing SiC-NCs comprising:
   (a) reacting a compound of the Formula I:

$$R^1Si(X^1)_3 \quad \text{(I)}$$

wherein $R^1$ is selected from $C_{1-10}$alkyl and $C_{6-14}$aryl; and each $X^1$ is independently selected from Cl, Br, I and $OC_{1-10}$alkyl, with a compound of the Formula II:

$$Si(X^2)_4 \quad \text{(II)}$$

each $X^2$ is independently selected from Cl, Br, I and $OC_{1-10}$alkyl, under conditions for the hydrolysis and condensation of the compound of the Formula I and the compound of the Formula II to form a siloxane polymer comprising repeating units of the Formula III:

$$-[(R^1SiO_{1.5})_x(SiO_2)_y]- \quad \text{(III)}$$

wherein $R^1$ is as defined above and x and y represent the molar ratio of $R^1SiO_{1.5}$ to $SiO_2$ as determined by amounts of the Formula I and the compound of the Formula II used in the hydrolysis and condensation reaction; and
   (b) thermal processing the siloxane polymer comprising repeating units of the Formula III under conditions to form SiC-NCs; and
   (c) optionally liberating the SiC-NCs to provide freestanding SiC-NCs, wherein each alkyl and aryl in $R^1$, $X^1$ and $X^2$ is independently unsubstituted or substituted with one or more halo.

2. The method of claim 1, wherein the molar ratio of the compound of Formula I to the compound of Formula II in step (a) controls the size of the resulting SiC-NCs.

3. The method of claim 2, wherein the larger the molar ratio of the compound of Formula I to the compound of Formula II the larger the resulting SiC-NCs.

4. The method of claim 1, wherein $R^1$ is selected from $C_{1-6}$alkyl and $C_{6-10}$aryl, and each $X^1$ is independently selected from Cl, Br, I and $OC_{1-6}$alkyl.

5. The method of claim 4, wherein $R^1$ is $C_{6-10}$aryl and each $X^1$ is the same.

6. The method of claim 4, wherein $R^1$ is phenyl.

7. The method of claim 1, wherein each $X^2$ is the same and is selected from Cl, Br, I and $OC_{1-6}$alkyl.

8. The method of claim 1, wherein each alkyl and aryl in $R^1$, $X^1$ and $X^2$ is independently unsubstituted or substituted with one or more fluoro.

9. The method of claim 1, wherein each alkyl and aryl in $R^1$, $X^1$ and $X^2$ is unsubstituted.

10. The method of claim 1, wherein the conditions for the hydrolysis and condensation of the compound of the Formula I and the compound of the Formula II to form a siloxane polymer comprise sol gel reaction conditions.

11. The method of claim 10, wherein the conditions for the hydrolysis and condensation of the compound of the Formula I and the compound of the Formula II to form a siloxane polymer comprise combining the compound of the Formula I and the compound of Formula II and adding an aqueous alcoholic solution to initiate the hydrolysis and condensation reaction at a temperature of about −20° C. to about 0° C. in an inert atmosphere.

12. The method of claim 11, wherein the alcohol is isopropyl alcohol (IPA) and the aqueous solution comprises about 40% to about 80% (v/v) of IPA.

13. The method of claim 11, wherein the volume of aqueous alcohol solution added is adjusted to maintain a constant $H_2O$ to $X^1+X^2$ ratio for each polymer composition.

14. The method of claim 11, further comprising stirring for about 12 to about 48 hours, with optional warming to a temperature of about 40° C. to about 80° C.

15. The method of claim 1, wherein the thermal processing of the siloxane polymer comprising repeating units of the Formula III under conditions to form SiC-NCs comprises (i) thermally processing the siloxane polymer under conditions to form silicon oxicarbide (SiOC): (ii) thermally processing the silicon oxicarbide under conditions to form SiC-NCs embedded in a carbon-rich silica matrix (CRSM); and (iii) thermally processing the SiC-NC's embedded in a CRSM under conditions to form SiC-NCs embedded in a $SiO_2$ matrix.

16. The method of claim 15, wherein the conditions in (i) comprise heating the siloxane polymer at a temperature of about 1000° C. to about 1200° C., under a slightly reducing atmosphere for about 0.5 hr to about 2 hr.

17. The method of claim 15, wherein the conditions in (ii) comprise heating the SiOC at a temperature of about 1300° C. to about 1500° C., under an inert atmosphere for about 1 hr to about 3 hr.

18. The method of claim 15, wherein the conditions in (iii) comprise heating the SiC-NC's embedded in a CRSM at a temperature of about 500° C. to about 800° C., in air for about 10 min to about 1 hr.

19. The method of claim 1, wherein the conditions for liberating the SiC-NCs comprise chemical etching of the SiC-NCs embedded in the $SiO_2$ matrix with an aqueous alcoholic solvent comprising HF.

20. The method of claim 1, wherein the SiC-NCs are further treated under conditions to incorporate functional groups on to the surface.

* * * * *

UNITED STATES PATENT AND TRADEMARK OFFICE
CERTIFICATE OF CORRECTION

| | | |
|---|---|---|
| PATENT NO. | : 7,906,672 B2 | Page 1 of 1 |
| APPLICATION NO. | : 12/637045 | |
| DATED | : March 15, 2011 | |
| INVENTOR(S) | : Jonathan Gordon Conn Veinot et al. | |

It is certified that error appears in the above-identified patent and that said Letters Patent is hereby corrected as shown below:

Title Page, Item (54) Title should read
-- METHOD FOR PREPARING SIZE-CONTROLLED SILICON CARBIDE NANOCRYSTALS --

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,906,672 B2 | Page 1 of 1 |
| APPLICATION NO. | : 12/637045 | |
| DATED | : March 15, 2011 | |
| INVENTOR(S) | : Jonathan Gordon Conn Veinot et al. | |

It is certified that error appears in the above-identified patent and that said Letters Patent is hereby corrected as shown below:

Title Page, Item (54) and at Column 1, lines 1-3, Title should read
-- METHOD FOR PREPARING SIZE-CONTROLLED SILICON CARBIDE NANOCRYSTALS --

This certificate supersedes the Certificate of Correction issued July 12, 2011.

Signed and Sealed this
Sixteenth Day of August, 2011

David J. Kappos
*Director of the United States Patent and Trademark Office*